March 8, 1932.   R. E. UPRIGHT ET AL   1,848,588
ORCHARD HEATER
Filed June 10, 1931
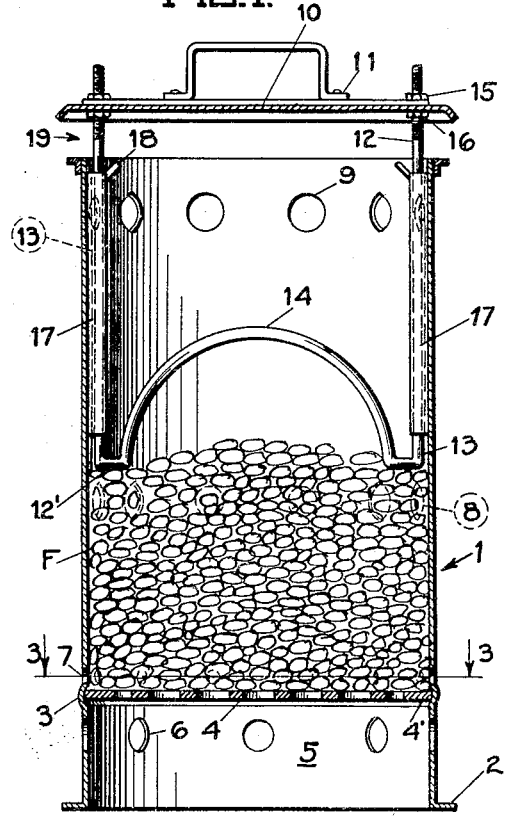
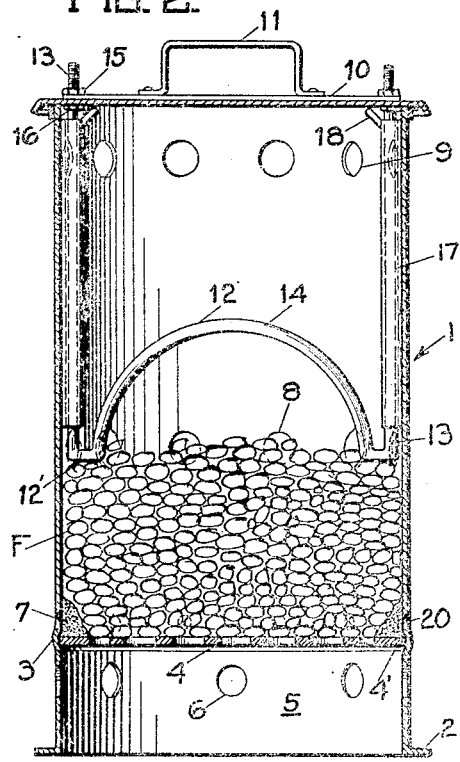
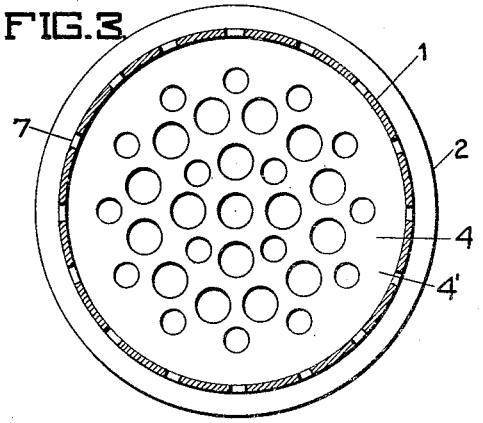
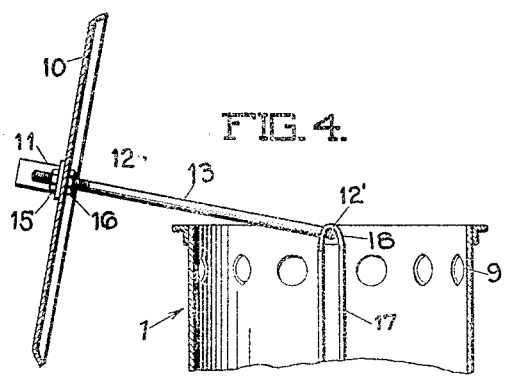
INVENTORS
R. E. UPRIGHT
J. H. GILLMOR
BY Hazard and Miller
ATTORNEYS Patented Mar. 8, 1932

1,848,588

UNITED STATES PATENT OFFICE

RALPH E. UPRIGHT AND JAMES H. GILLMOR, OF SAN FERNANDO, CALIFORNIA

ORCHARD HEATER

Application filed June 10, 1931. Serial No. 543,369.

Our invention relates to an orchard heater using solid fuel.

It is an object of our invention to provide an orchard heater of the solid fuel type simple and inexpensive of construction and which requires a minimum of attention in its operation.

Another object is to provide an orchard heater that will automatically control the draft conditions so that after the fuel has been burning for a predetermined period and a live bed of coal with a corresponding increase of heat has been attained, the supply of air for combustion is gradually cut off so that less heat will be given off by the orchard heater. It is the aim to generate heat quickly to raise the temperature of the air in the orchard above the temperature that would injure the fruit and the trees. When the danger point is passed, less heat is required to maintain the desired temperature conditions. Very large numbers of heaters are necessary to effectively prevent frost in orchards and they must be serviced in a minimum amount of time, which service constitutes a difficult problem. Our heater is so designed as to automatically slow down the combustion, adjustable means being provided to regulate the time factor. The heater has a capacity to heat the orchard for one night, say about eight hours. Very often immediately before sunrise a decided drop in temperature takes place and we have provided means in our heater that by an instant's manipulation the combustion in the last period can be raised to its maximum efficiency so as to maintain the proper temperature conditions in the orchard.

In particular, our heater is provided with a lid which is, in its first period of operation, spaced vertically above the top of the fuel container and provides a draft opening for rapid combustion. Means are provided to gradually close the lid down upon the container as the fuel is consumed, and, in addition, the ashes formed will gradually close draft openings so that the combustion is adjusted to the temperature conditions in the orchard.

With the above and other objects in view, which will appear as the description proceeds, our invention consists in the construction and arrangement of parts hereinafter described and claimed.

In the accompanying drawings, which form a part of this specification, we have illustrated a preferred form of an orchard heater embodying our invention and in which:

Fig. 1 is a vertical central section of our orchard heater showing the position of the lid at the beginning of the operation;

Fig. 2 is a similar view after the orchard heater has been in operation for some time and the lid has closed down on the top of the fuel container;

Fig. 3 is a horizontal section taken on the line 3—3 of Fig. 1;

Fig. 4 is a detailed section showing the mechanism for swinging the lid bodily to one side of the fuel container.

Referring to the drawings, 1 indicates a tubular metal casing, preferably cylindrical in form, having a horizontal flange 2 at the bottom which supports the heater on the ground. Spaced from the bottom the wall is provided with an annular groove 3 which may be made by a rolling operation for the reception of any suitable grate 4. The space between the grate 4 and the ground constitutes an ash pit chamber 5. A series of spaced holes 6 are provided in the casing 1, admitting air to the ash pit chamber 5.

Immediately above the grate 4, the casing 1 is provided with a number of primary auxiliary air openings 7; these openings 7 are relatively small and spaced fairly close together. Approximately midway in the casing 1 is a series of secondary auxiliary spaced openings 8, and spaced a slight distance from the top, the casing 1 is provided with a series of tertiary auxiliary air openings 9. The air openings 9 function to supply air from the outside to the interior of the casing 1 in the beginning of the operation, but later when the lid has closed down upon the casing they serve as waste gas outlet openings, as will be hereinafter explained. 10 is a lid adapted to form a closure for the casing 1 and is provided with a handle 11. The same is supported by a lid closing device indicated by 12 as a unit. The same consists of a U-shaped rod having vertical legs 13 adapted to rest on the solid fuel F and having an arcuate connecting rod 14. The upper ends of legs 13 pass through the lid and may be vertically adjusted in relation thereto by means of nuts 15 and 16 screw threaded on the legs 13. Vertical guides 17 fastened to the inner wall of the casing 1 receive the legs 13 in slidable relation. The upper ends of the guides 17 are provided with ears 18 extending upwardly and inwardly therefrom.

Operation: Solid fuel, such as petroleum coke briquets, egg size, is placed upon the grate 4; the average quantity for eight hours' operation is about eighteen pounds of such fuel. Then a kindling material for starting the briquets, such as about one pound of paraffined peach pits, is placed on top of the briquets and is ignited by any suitable means. The lid 10 is then swung into position above the casing, and the lid support 12 sliding along the guides 17 will come to rest upon the briquets F as shown in Fig. 1, the lid 10 being spaced from the casing 1 providing an annular outlet 19 for the hot gases of combustion. It should be noted that the lid support 12 rests on the fuel, preferably at the lower ends only as indicated at 12'. The arcuate rod 14 serves to take care of any expansion of the lid support 12 and prevents binding of the vertical legs 13 in the guides 17. Air of combustion is supplied through the openings 6, passing into the ash pit 5 and through the grate. In addition, air through the small openings 7 adjacent the grate 4 will pass through the pile of briquets. Additional air is supplied through intermediate openings 8 and upper openings 9. This copious supply of air will start a vigorous combustion and will consume about three pounds of briquets during the first hour.

It is desirable to provide a large supply of hot gases for the orchard in the beginning of the operation. In about an hour's time as the briquets are partially consumed and settle in the casing 1, the lid support 12 and lid 10 connected thereto will gradually settle by gravity so that the lid will close the top of the casing as shown in Fig. 2. Now the upper openings 9 serve as the outlets for the hot gases of combustion. There will now be a bed of red hot briquetes on the grate, and it is now desirable to moderate the rate of combustion which is effected by the closing of the lid 10, cutting down the draft, and also by the deposit of ashes 20 which will more or less clog up the small air openings 7 adjacent to the grate 4. The grate 4 is provided with an annular solid portion 4' on its periphery, forming a ring-like shelf for the reception of the ashes. At this stage of the operation of the orchard heater the quantity of air of combustion passing through the openings 6 leading to the ash pit 5 and through the grate is diminished as the briquets partially consumed and mixed with ashes will offer more resistance to the passage of air therethrough. Additional air for combustion passes through the openings 8 as before but these openings are above the bed of briquets. The combustion is maintained at this reduced rate, which is sufficient to maintain temperature conditions above the point of injury to the orchard. The fuel consumption is now from two to two and one-half pounds per hour and it will gradually decrease to one and one-half to one pound per hour. It will be understood that conditions of atmosphere will somewhat modify the rate of combustion depending upon whether the air is still or breezy.

It should be noted that very little smoke is produced in our improved orchard heater. This is partly due to the additional air supply through openings 8 and 9 above the fuel. When it is desired to accelerate the rate of combustion this can be done by a simple instantaneous operation in lifting the lid 10 vertically upward until the lower ends of the lid support 12 engage the ears 18. Then the lid and the lid support are tilted to one side away from the casing 1 as shown in Fig. 4. It is sometimes desirable just before sunrise to accelerate the rate of combustion for the reason that often at this time a decided drop of temperature takes place.

Various changes may be made in the construction and arrangement of parts by those skilled in the art without departing from the spirit of our invention as claimed.

We claim:

1. An orchard heater for burning solid fuel comprising a tubular casing open at top and bottom and having an ash chamber at the bottom provided with air supplying means, a grate above the ash chamber, said grate having an annular shelf adjacent the casing, a series of relatively small primary air supply openings slightly above and spaced around about the grate in the casing, a series of intermediate spaced openings in the casing, another series of spaced openings near the top of the casing, a lid for the top of the casing, a vertically adjustable lid support comprising a U shaped rod having an intermediate arcuate portion and adapted to rest on the fuel, guides on the inner wall of the casing in which the lid support is slidably disposed, and ears at the upper ends of the guides to permit the lid to be swung bodily to one side of the casing.

2. An orchard heater for burning solid fuel comprising a tubular casing open at the top and having an ash chamber at the bottom provided with air supply means, a grate above the ash chamber, said grate having an annular shelf adjacent the casing, a series of spaced primary air supply openings in the casing and adjacent to the shelf, a series of spaced openings in the casing near the top thereof, a lid for the top of the casing, a vertically adjustable lid support normally resting on the fuel, guides for vertical movement of the lid support, and means permitting the lid to be swung bodily to one side of the casing.

3. An orchard heater for burning solid fuel comprising a tubular casing open at the top and provided with an ash chamber at the bottom and having air supply means for the ash chamber, a grate above the ash chamber, a series of spaced openings in the casing near the top thereof, a lid for the top of the casing, a lid support normally resting on the fuel, guides for the lid support, and means engaging the lid support to permit the lid to be swung bodily to one side of the casing.

4. An orchard heater for burning solid fuel comprising a tubular casing open at the top and having an ash chamber, a grate, a series of spaced air supply openings in the casing admitting air to the space immediately above the grate, a series of spaced openings in the top of the casing, a lid for the top of the casing, and a lid support normally resting on the fuel and permitting the lid to move into closing position as the fuel burns away.

5. An orchard heater for burning solid fuel comprising a tubular casing open at the top and having an ash chamber at the bottom provided with air supply means, a grate above the ash chamber, a series of spaced primary air supply openings in the casing permitting air to the space immediately above the grate, a series of spaced openings in the casing in the upper part thereof, a lid for the top of the casing, and a lid support normally resting on the fuel and permitting the lid to move into closing position as the fuel burns away.

6. An orchard heater for burning solid fuel comprising a tubular casing open at the top, an ash chamber at the bottom and having a grate spaced from the lower end thereof, a series of spaced primary air supply openings in the casing adjacent the grate, a series of spaced openings in the casing above said first named openings, a lid for the top, means operatively connected to the top and resting upon the fuel to hold the lid vertically above the top of the casing in the beginning of the operation of the heater by permitting the lid to move into closing position as the fuel burns away.

7. An orchard heater for burning solid fuel comprising a tubular casing open at the top, a grate in the lower end of the casing, air supply means in the casing above the grate, a lid for the top of the casing, and means engaging the fuel to hold the lid in spaced relation above the top of the casing at the beginning of the operation of the heater and permitting the lid to move into closing position as the fuel burns away.

In testimony whereof we have signed our names to this specification.

RALPH E. UPRIGHT.
JAMES H. GILLMOR.